United States Patent [19]

Inciong et al.

[11] Patent Number: 4,655,463
[45] Date of Patent: Apr. 7, 1987

[54] GASKET ASSEMBLY FOR OIL PAN VALVE COVERS AND THE LIKE

[75] Inventors: Josefino T. Inciong, Skokie; Edward S. Widder, Niles, both of Ill.

[73] Assignee: Felt Products Mfg. Co., Skokie, Ill.

[21] Appl. No.: 903,603

[22] Filed: Sep. 5, 1986

[51] Int. Cl.⁴ .............................................. F16J 15/12
[52] U.S. Cl. .................................... 277/180; 277/166; 277/235 B
[58] Field of Search ........... 277/180, 233, 234, 235 A, 277/235 R, 235 B, 166

[56] References Cited

U.S. PATENT DOCUMENTS 3,473,813  10/1969  Meyers et al. ...................... 277/180
4,026,565   5/1977  Jelinek ......................... 277/235 B X
4,535,996   8/1985  Cardis et al. ....................... 277/180

FOREIGN PATENT DOCUMENTS 1213237  11/1970  United Kingdom ............ 277/235 B

*Primary Examiner*—Robert S. Ward
*Attorney, Agent, or Firm*—Dressler, Goldsmith, Shore, Sutker & Milnamow, Ltd.

[57] ABSTRACT

A gasket assembly having improved compression stoppers. The stoppers facilitate the rapid, easy and certain securance of the stoppers in a predetermined relationship in a gasket assembly. A gasket assembly, in accordance with this invention desirably comprises a main body having a pair of side sections, each comprising a self supporting core member and compressible facings fast with the core member and defining fastener openings through which fasteners are adapted to pass. The core members extend along the side sections of the gasket assembly, said facings and said core providing side sections of a first thickness. The main body further comprises end portions joining the side sections. Separate compression stoppers are provided in the fastener openings. The compression stoppers are compression and high-temperature resistant, and are secured in the openings in the main gasket body, the compression stoppers comprising a pair of press-fit annuli together defining a peripheral groove means in which the core member is disposed, thereby to retain the compression stoppers in the fastener openings and in a predetermined relationship to the outer surfaces of the facings.

4 Claims, 4 Drawing Figures

GASKET ASSEMBLY FOR OIL PAN VALVE COVERS AND THE LIKE

BACKGROUND OF THE INVENTION

This invention relates to improved gasket assemblies, and particularly to improved oil pan gaskets, valve cover gaskets and the like for automotive use.

Oil pan gaskets, valve cover gaskets and the like are typically made of rubber, cork, and cork-rubber sheets or laminates. Such gaskets define openings through which fasteners, such as bolts, extend between the clamping surfaces. When the fasteners are torqued down, the gaskets are sometimes excessively compressed causing splitting, thereby resulting in the undesirable formation of leakage paths.

It has been suggested that stops be used to control the degree of compression permitted at the fastener holes. In one recent development, disclosed in U.S. Pat. No. 4,535,996, rigid stops are provided in fastener openings in a unitary, molded gasket. The stop members are secured to the core by a staking operation. Such stops limit compression of the gasket and also limit displacement of the elastomer adjacent the opening, thereby to avoid leakage problems resulting from excessive compression of the gasket.

It would be desirable to provide an improved means for limiting compression of gaskets in fastener apertures which did not require a staking operation to secure compression stoppers in place and which was easy to assemble.

SUMMARY OF THE INVENTION

In accordance with the present invention, a gasket assembly having improved compression stoppers is provided. The stoppers facilitate the rapid, easy and certain securance of the stoppers in a predetermined relationship in a gasket assembly. A gasket assembly, in accordance with this invention desirably comprises a main body having a pair of side sections, each comprising a self supporting core member and compressible facings fast with the core member and defining fastener openings through which fasteners are adapted to pass. The core members extend along the side sections of the gasket assembly, said facings and said core providing side sections of a first thickness. The main body further comprises end portions joining the side sections.

Separate compression stoppers are provided in the fastener openings. The compression stoppers are compression and high-temperature resistant, and are secured in the openings in the main gasket body, the compression stoppers comprising a pair of press-fit annuli together defining a peripheral groove means in which the core member is disposed, thereby to retain the compression stoppers in the fastener openings and in a predetermined relationship to the outer surfaces of the facings. The compression stoppers are of a second thickness less than the first thickness. Thus, when the gasket assembly is disposed to be compressed between elements to be sealed, the compression stoppers limit compression of the gasket assembly to prevent destruction of the gasket assembly.

Preferably the pair of annuli comprises a first member having a flat stopper surface, and defining a central opening to receive a bolt, a truncated conical surface, and a sleeve opposite the flat stopper surface, and a second washer-like member having a second flat stopper surface, a central opening adapted to receive the sleeve and a truncated conical surface. The conical surfaces converge inwardly toward a central portion of the stopper to provide the groove means. Desirably the second thickness is at least seventy five percent of the first thickness and the self supporting core members are formed of metal.

Further objects, features and advantages of the present invention will become apparent from the following description and drawings.

DESCRIPTION OF A PRESENTLY PREFERRED EMBODIMENT

Figure 1:
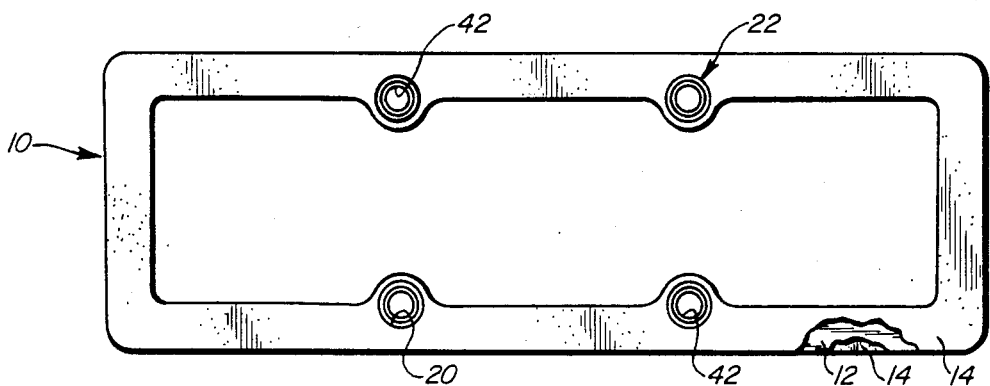
FIG. 1 is a plan view of a gasket assembly in accordance with the present invention.

Referring now to the drawings, a presently preferred embodiment of the present invention is shown in FIGS. 1 to 4. FIG. 1 illustrates a typical gasket assembly 10 in which the present invention is used. Gasket assembly 10 is a typical valve cover gasket. However other gaskets, such as the oil pan gasket illustrated in U.S. Pat. No. 4,535,996, the disclosure of which is here incorporated by reference, may benefit from the practice of the invention as well.

Gasket assembly 10 comprises a main body section having a central metallic core 12 and a pair of facings such as cork-rubber facings 14 fast with the core 12. Other facings such as cork or elastomers of the types known for use in such applications may be used as well. The core may be continuous, that is to say the core may extend throughout the entire perimeter of the gasket assembly, or may be disposed only in the sides of the gasket assembly bearing the fastener openings, as in the manner described in U.S. Pat. No. 4,535,996. The core 12 does surround the fastener openings 20 in the gasket and preferably projects to the very edges of the openings 20.

In accordance with the present invention improved compression stopper means are positioned in the fastener openings 20. In the embodiment shown the stopper means comprises a two-part compression stopper 22. A first stopper part 24 is an annulus which is a washer-like truncated cone. Stopper part 24 is relatively flat and defines a first compression face 26, a perimetric edge 27 having a base surface 28, a central opening 30 and a conical outer surface 32.

Figures 3, 4:
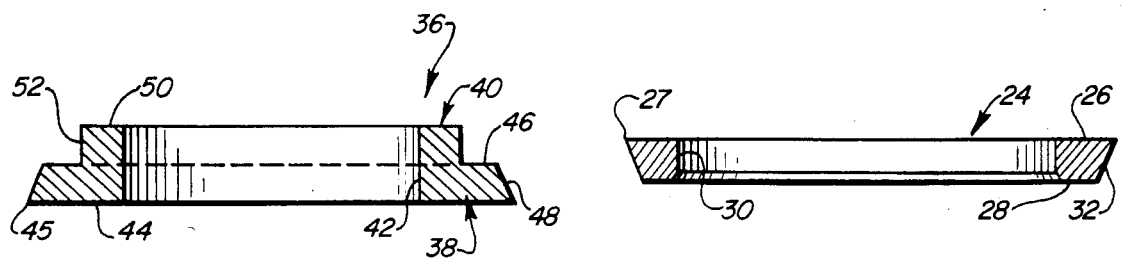
FIG. 3 is an enlarged cross-sectional view of a first part of a compression stopper of the present invention.
FIG. 4 is an enlarged cross-sectional view of a second part of a compression stopper of the present invention.

The second or other part 36, as seen in FIG. 4, is an annulus which is generally hat-shaped in cross-section. It comprises a base 38 and a sleeve portion 40 which together define a cylindrical opening 42 therethrough. The opening 42 is proportioned to receive a fastener, such as a bolt, for securing to each other the service surfaces (such as the valve cover and the head) between which gasket assembly 10 is to be clamped, which bolt then applies a clamping load to the gasket assembly.

The base 38 defines a compression face 44 having a perimetric edge 45, a shoulder 46 and a conical perimetric or outer surface 48. The upper surface 50 of the sleeve may also serve as a compression face portion.

The central opening 30 of the first part 24 is preferably proportioned to be press-fit onto the outer perimetric surface 52 of sleeve portion 40. Thus the surfaces defining opening 30 and surface 52 are preferably complementary in configuration, although it will be apparent that other configurations which facilitate connection and retention of the parts, one with the other, may be used as well. It is also preferable that surfaces 28 and 46 be generally flat so that they precisely locate the two parts 24, 36 relative to each other. However configurations other than flat surfaces may be used as well.

Figure 2:
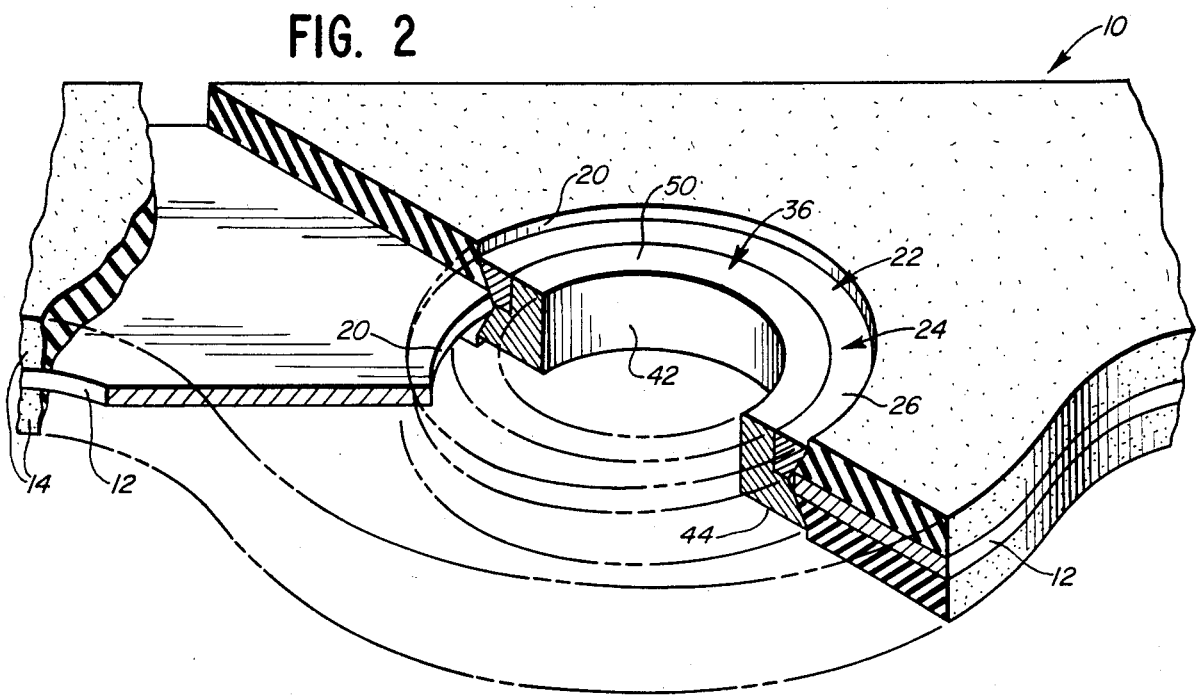
FIG. 2 is an enlarged fragmentary perspective view of a portion of FIG. 1.

As best seen in FIG. 2, when the parts 24, 36 are juxtaposed, they together define a groove 54 which diverges upwardly and downwardly from the center of the assembled parts. The diameter or other dimension of the groove between surfaces 26 and 44 is less than that of the parts at surfaces 26 and 44, i.e., at the perimetric edges 27 and 45 of surfaces 26, 44. As such when the fastener opening 20 is less than the peripheral dimensions of perimetric edges 27, 45, the compression stopper 22 will be retained in the opening 20 and will be substantially and appropriately centered on the metallic core 12, hence on the gasket assembly 10.

It will be apparent that the assembly of the compression stopper 22 with the gasket itself is easily, quickly and inexpensively achieved. It is simply necessary to provide appropriately rigid parts for the particular gasket and to provide the fastener openings 20 in the main gasket body. Thereafter the fastener parts 22, 36 are supplied to a suitable fixture in juxtaposition with the gasket openings, and the compression stopper parts are then squeezed together in a sufficient press-fit to prevent them from separating from each other and from the gasket assembly 10. Where readily compressible and displaceable materials such as cork are used as facings, it will probably be unnecessary even to remove or eliminate the facings adjacent the openings 20. In some cases it may be desirable to provide for a slight projection of the core inwardly of the adjacent facings, thereby to assure the certain affixation and closing of the parts 22, 36 to each other and to the main gasket body.

In a typical gasket in accordance with the present disclosure a valve cover gasket assembly 10 may be about 0.112 inch thick. The metal core 12 is of a cold-rolled steel 0.010 inch thick, and the facings are about 0.051 inch thick. The facings 14 are adhesively laminated to the core 12 and comprise a cork rubber sheet comprising approximately 75 percent nitrile rubber. Other rubbers, such as neoprene, styrene-butachene rubber and polyacrylic rubber may be used as well. The fastener openings at the core 12 are about 0.60 inch in diameter.

The compression stoppers define a cylindrical fastener opening 42 about 0.39 inch in diameter. The perimetric edges 27, 45 are about 0.640 inch in diameter. The groove 54 is about 0.58 inch in diameter and is just slightly less than the fastener opening in the metal core, thereby to center the compression stopper 22 appropriately in an opening 20. The compression stopper parts 22, 36 are preferably made of sintered metal, such as of powdered iron. However, they may also be formed of machined metal or even of hard plastic which is suitably temperature and torque resistant.

The assembled thickness of the two part compression stopper 22 may be about 0.10 inch, about 12% less than the thickness of the gasket assembly adjacent the fastener openings 20. Thus, when the fasteners are torqued down, the compression will be limited to about 12%. Desirably the maximum permitted compression should be no more than up to about 25% depending upon the materials from which the gasket assembly is fabricated, i.e., the second compression stopper thickness is at least seventy five percent of first gasket thickness. In any event the compression stoppers should be of a thickness less than the thickness of the gasket body adjacent the openings 20.

The compression stopper may be otherwise configured, consistent with the provision of two parts which appropriately retain each other, engage the core and retain the stopper in a predetermined relationship with the gasket assembly body, and which predeterminedly control the desired degree of compression of the main body of the gasket assembly. Thus, for example, the groove 54 need not necessarily be a continuous circular groove.

From the foregoing, it will be apparent to those skilled in the art that further modifications may be made and provided without departing from the spirit of the invention. Accordingly, the scope of the invention is to be considered to be limited only to the extent made necessary by the claims.

What is claimed is:

1. A gasket assembly comprising
a main body having a pair of side sections, each comprising a self-supporting core member and compressible facings fast with said core member and defining fastener openings through which fasteners are adapted to pass, said core members extending along said side sections of the gasket assembly, said facings and said core providing side sections of a first thickness, and end portions joining said side sections, and
separate compression stoppers in said fastener openings, said compression stoppers being compression and high-temperature resistant, and being secured in said openings in said main gasket body, said compression stoppers comprising a pair of press-fit annuli together defining a peripheral groove means in which said core member is disposed, thereby to retain said compression stoppers in said fastener openings and in a predetermined relationship to the outer surfaces of said facings, and said compression stoppers being of a second thickness less than said first thickness, whereby when said gasket assembly is disposed to be compressed between elements to be sealed, said compression stoppers limit compression of said gasket assembly to prevent destruction of said gasket assembly.

2. A gasket assembly in accordance with claim 1, and wherein said pair of annuli comprises a first member having a flat stopper surface, and defining a central opening to receive a bolt, a truncated conical surface, and a sleeve opposite said flat stopper surface, and a second washer-like member having a second flat stopper surface, a central opening adapted to receive said sleeve and a truncated conical surface, said conical surfaces converging inwardly toward a central portion of said stopper to provide said groove means.

3. A gasket assembly in accordance with claim 1, and wherein said second thickness is at least seventy-five percent of said first thickness.

4. A gasket in accordance with claim 1, and wherein said self supporting core members are formed of metal.

* * * * *